United States Patent [19]

Diggle

[11] Patent Number: 4,562,773

[45] Date of Patent: Jan. 7, 1986

[54] PRINTING MACHINE WITH LABEL STOCK INDEXING MECHANISM

[75] Inventor: Steven J. Diggle, Bury, England

[73] Assignee: Markem Systems Limited, Salford, England

[21] Appl. No.: 676,934

[22] Filed: Nov. 30, 1984

[30] Foreign Application Priority Data

Nov. 30, 1983 [GB] United Kingdom ................. 8331899

[51] Int. Cl.[4] .......................... B31F 1/07; B32B 31/00

[52] U.S. Cl. ...................................... 101/27; 156/384; 156/361; 156/368; 156/379.8; 101/DIG. 19

[58] Field of Search ........... 101/11, 227, 27, DIG. 19; 270/1.1; 156/353, 351, 350, 361, 366, 367, 368, 379.8, 384–388, DIG. 37, DIG. 45, DIG. 47, DIG. 49

[56] References Cited

U.S. PATENT DOCUMENTS

| | | | |
|---|---|---|---|
| 3,657,051 | 4/1972 | McCarthy | 101/27 X |
| 3,726,212 | 4/1973 | Combs | 101/27 |
| 3,816,210 | 6/1974 | Aoko et al. | 156/361 X |
| 3,951,061 | 4/1976 | Bremmer, Jr. | 101/227 X |
| 4,153,496 | 5/1979 | Swift | 156/384 |
| 4,174,237 | 11/1979 | Hemming, Jr. et al. | 156/361 X |
| 4,236,955 | 12/1980 | Prittie | 156/361 X |
| 4,264,396 | 4/1981 | Stewart | 156/384 |
| 4,276,112 | 6/1981 | French et al. | 156/384 X |
| 4,281,335 | 7/1981 | Moore et al. | 101/227 |
| 4,318,340 | 3/1982 | Shenoha et al. | 101/27 |
| 4,321,103 | 3/1982 | Lindstrom | 156/384 |
| 4,334,645 | 6/1982 | Connington | 101/227 X |
| 4,387,641 | 6/1983 | Kortick | 101/27 |
| 4,397,709 | 8/1983 | Schwenzer | 156/384 X |
| 4,422,376 | 12/1983 | Teraoka | 101/69 |
| 4,439,257 | 3/1984 | Yo Sato et al. | 156/384 X |
| 4,452,659 | 6/1984 | Geurtsen et al. | 156/361 |
| 4,460,421 | 7/1984 | Booth et al. | 156/361 X |
| 4,488,925 | 12/1984 | Craig et al. | 156/361 X |

FOREIGN PATENT DOCUMENTS

| | | |
|---|---|---|
| 1249321 | 10/1971 | United Kingdom . |
| 1356014 | 6/1974 | United Kingdom . |
| 1511532 | 5/1978 | United Kingdom . |

*Primary Examiner*—E. H. Eickholt
*Attorney, Agent, or Firm*—Robbins & Laramie

[57] ABSTRACT

A printing machine for printing labels, for example, comprises an indexing mechanism for use in indexing predetermined lengths of label stock or web through a printing mechanism. The indexing mechanism comprises an indexing roller, a motor for driving the roller, a transmission operatively connecting the motor and the indexing roller and including a driven shaft coupled to the indexing roller and mounting a fast clutch, a slow clutch and a brake. Control circuitry for controlling the clutches and the brake is provided and includes means for pre-setting the length of stock or web to be indexed, signal-generating means operated by the printing mechanism to generate a "start" signal adapted to load the pre-set indexed length into a counter, encoding means operated from the indexing roller drive transmission to provide a pulsed output, one pulse equalling a predetermined distance of length travel, and to decrement the counter, and gating logic driven from the counter output to control the clutches and brake either to give a fast and subsequently slow pull to each pre-set index length or a slow pull to the pre-set index length dependent upon the value of the pre-set indexed length.

9 Claims, 8 Drawing Figures

PRINTING MACHINE WITH LABEL STOCK INDEXING MECHANISM

This invention relates to printing machines, especially but not exclusively hot foil label printing machines.

With such machines it is necessary, as is well known to those skilled in the art, to provide an adjustable indexing mechanism whereby label stock can be indexed stepwise through the machine in controlled lengths for presentation to a printing head, usually a heated, ram-controlled pressure die to which is fitted appropriate type or similar, and subsequently to a ram-controlled cutting head whereat waste label material is severed.

Hitherto, an indexing roller has been mechanically coupled to and driven from the same drive as the printing and cutting rams.

It is an object of the present invention to separate the indexing drive from the main drive of the machine since it is considered that this will permit not only a more accurate but a simpler control of the indexed length of label stock.

According to the present invention there is provided a printing machine for printing labels, for example, and comprising an indexing mechanism for use in indexing predetermined lengths of stock or web through a printing mechanism, the indexing mechanism comprising an indexing roller, a motor for driving the roller, a transmission operatively connecting the motor and the indexing roller and including a driven shaft coupled to the indexing roller and mounting a fast clutch, a slow clutch and a brake, and control circuitry for controlling the clutches and the brake and including means for pre-setting the length of stock or web to be indexed, signal-generating means operated by the printing mechanism to generate a "start" signal adapted to load the pre-set indexed length into a counter, encoding means operated from the indexing roller drive transmission to provide a pulsed output, one pulse equalling a predetermined distance of length travel, and to decrement the counter, and gating logic driven from the counter output to control the clutches and brake either to give a fast and subsequently slow pull to each pre-set index length or a slow pull to the pre-set index length dependent upon the value of the pre-set indexed length.

As a result of the present invention there is improved accuracy of indexing relative to known label printing machines and it is possible to re-register as will be described later.

An embodiment of the present invention will now be described, by way of example, with reference to the accompanying drawings, in which.

Figure 1:
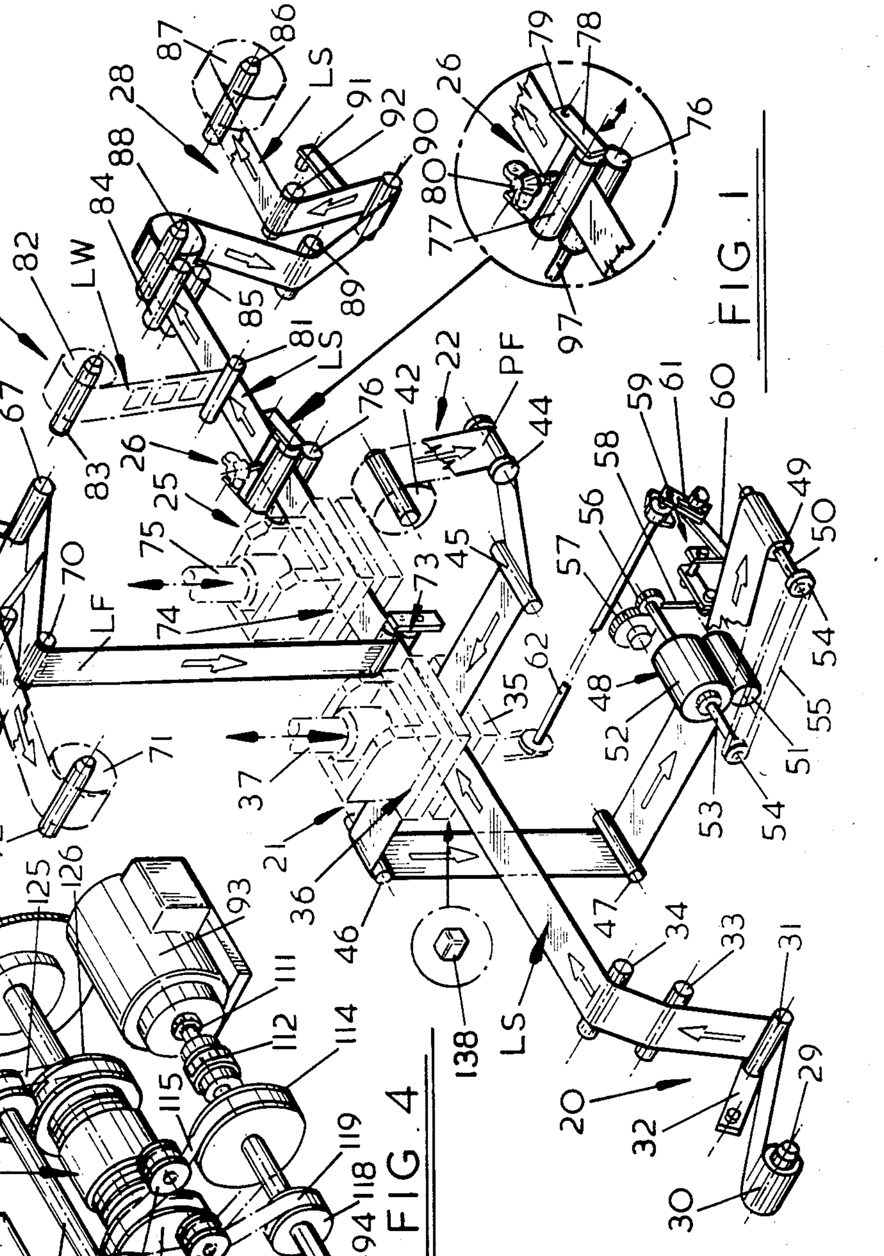
FIG. 1 is a diagrammatic perspective view of the general layout of a known label producing machine.
Figure 4:
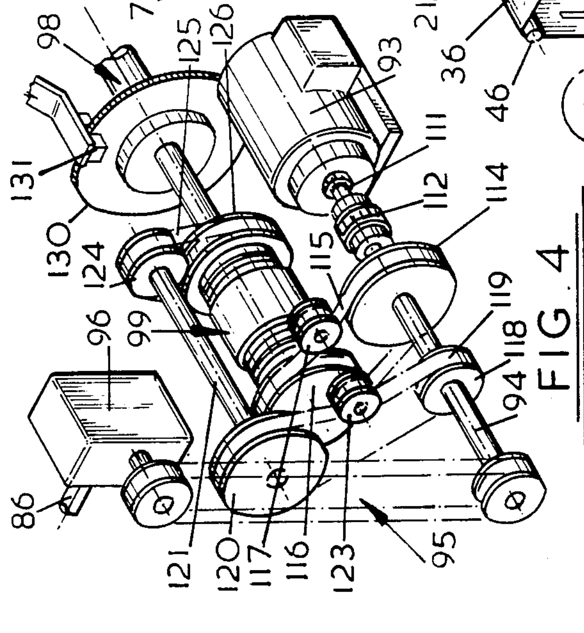
FIG. 4 is a perspective view corresponding to FIGS. 2 and 3.

The label producing machine is generally constructed and generally operates as the machine disclosed in our Patent Application No. 647 726 filed Sept. 6th 1984.

The label printing machine comprises a label stock supply or feed-off station 20, a printing station 21 at which label stock LS (backing layer and adhesive label web) and printing foil PF from a printing foil supply station 22 merge, a laminate supply station 23 (including a laminate backing collection device 24) from which laminate film LF is delivered to the printed label stock LS to be applied to and to flow with the label stock LS, a die-cutting station 25 for cutting the laminate film LF and the adhesive label web to define label areas, a label stock indexing station 26, a laminate waste collection station 27 and a label stock (printed, laminated and cut) collection station 28.

The label stock supply or feed-off station 20 comprises a drive shaft 29 onto which is detachably secured a supply reel 30 of label stock LS, the drive shaft 31 is continuously driven but the transmission of drive to the supply reel 32 is controlled by an alternately-operable brake and clutch (not shown) operable by an indexing mechanism control circuit. A dancer or kicker roller 31 carried by a pivoted arm 32 is disposed downstream of the supply reel 30, in terms of label stock flow through the machine, movement of which arm 36 is related to the operations of the aforesaid brake and clutch.

The label stock LS extends from the suppply reel 30 around the kicker roller 31 and then up and over two guide rollers 33, 34 into the printing station 21.

The printing station 21 has a printing bed 35 on which the label stock LS dwells during printing. This printing bed 35 is height and level adjustable by conventional means known to those skilled in the art and not forming part of this invention.

Figure 2:
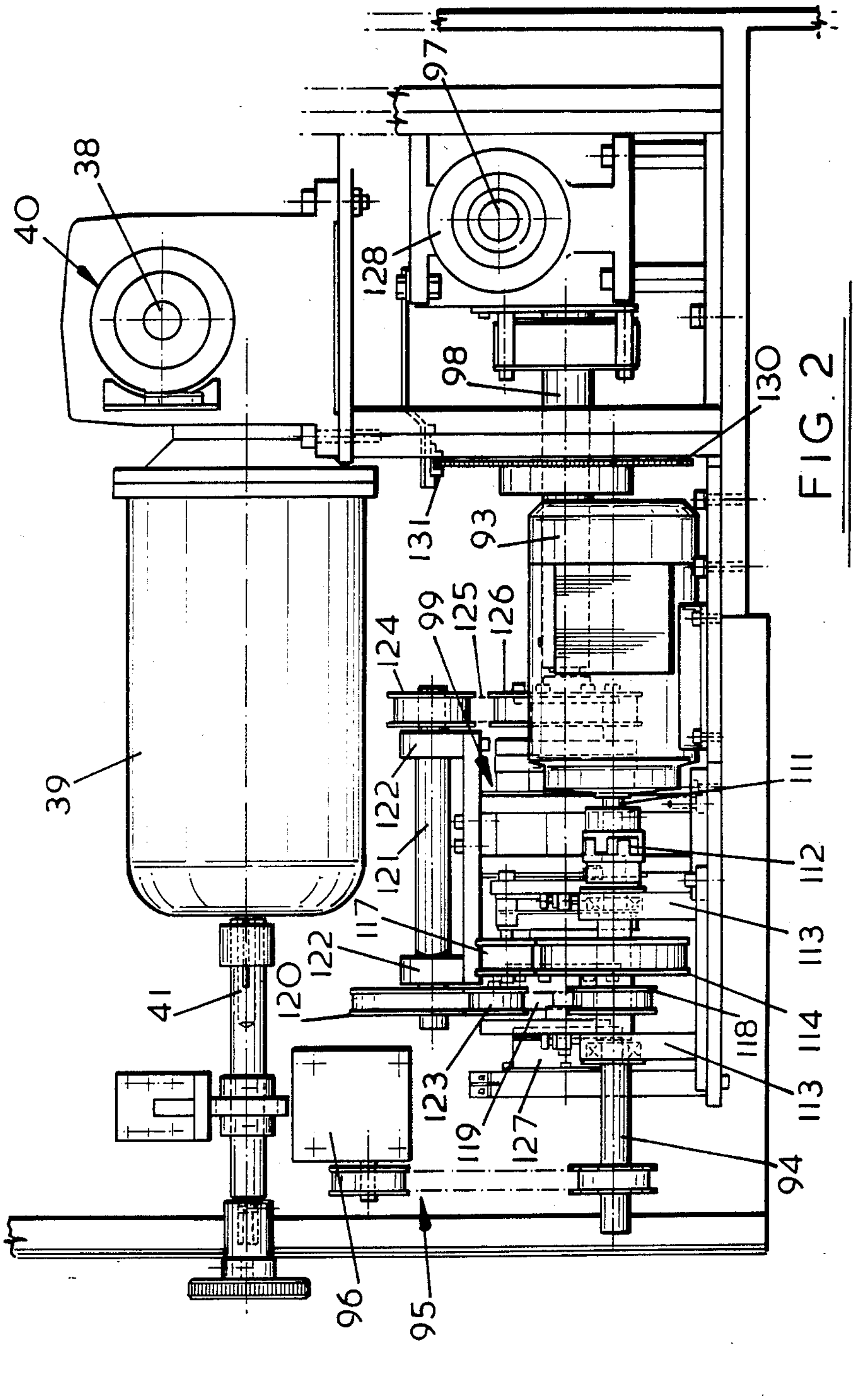
FIG. 2 is a front view of the label stock indexing mechanism of the machine and which is the subject of the present invention.
Figure 5:
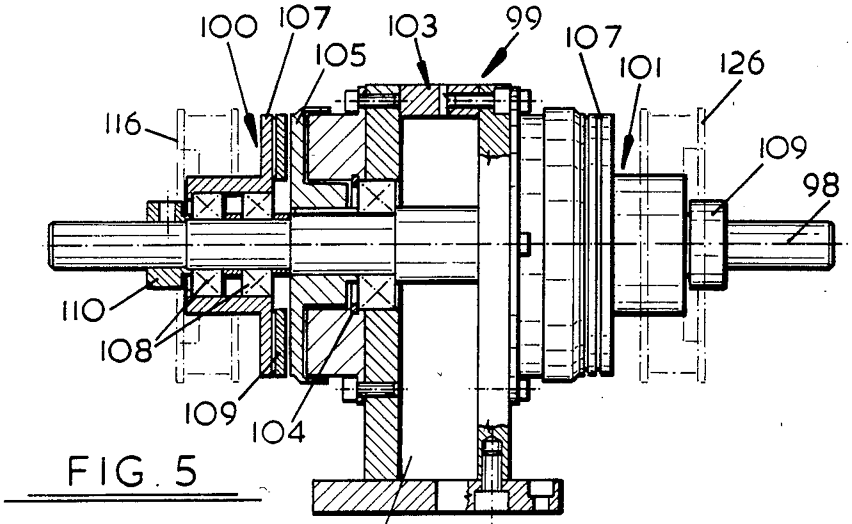
FIG. 5 is a part-sectional plan view of the double clutch arrangement.
Figure 3:
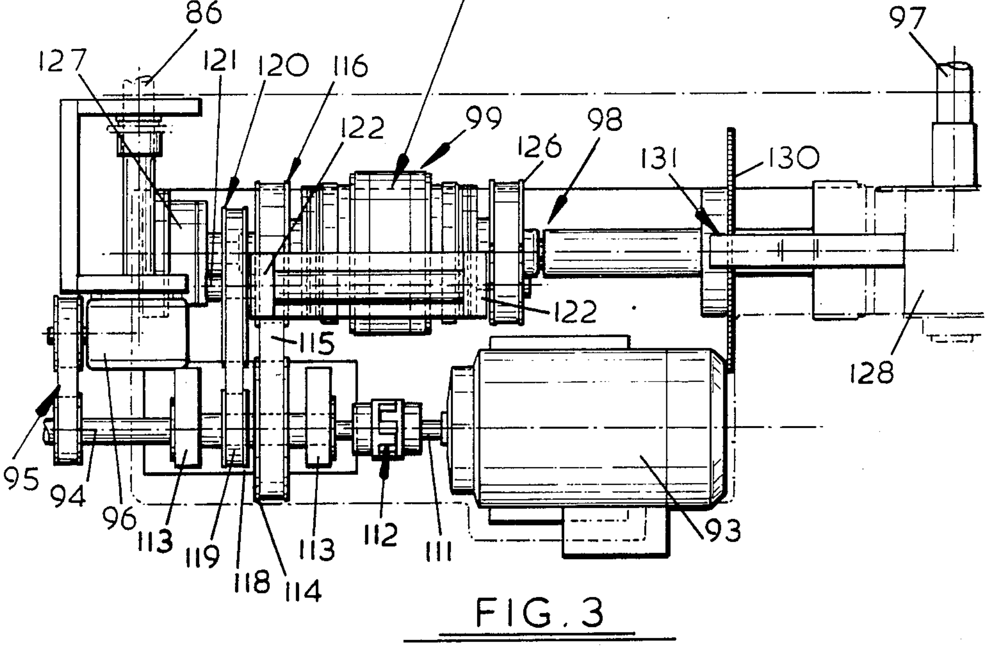
FIG. 3 is a plan view corresponding to FIG. 2.

Above the printing bed 35 is an assembly 36 of a heater box and printing head adapted releasably to mount the type required for printing. The heater/printing assembly 36 is carried by a ram 37 movable by a crank (not shown) or other conventional means for converting rotary motion into linear motion connected to a continuously-driven shaft 38 (see FIG. 2) driven by an electric motor 39 via bevel gearing 40. A manual operating shaft 41 normally spaced from the motor shaft is provided for engaging the latter to permit the ram 37 to be "inched" when setting up the label producing machine.

Printing foil PF activated by heat is supplied to the printing area to overlie the label stock LS during each printing operation.

The printing foil PF is fed from a supply reel 42 mounted on a freely rotatable spindle 43 and passes under guides 44 and 45 and then across the label stock flow path at the background printing area, down round an upper guide rod 46 and a lower guide rod 47 and back across but under the label stock flow path, through a nip 48 and onto a collection reel 49 detachably secured on a driven shaft 50.

The nip 48 is defined by a bottom freely-rotatable rubber-covered pressure roller 51, whereof the pressure can be adjusted in any convenient known manner, and an indexing roller 52 fast on a driven shaft 53. At one end (the non-driven end), the shaft 53 is connected by a gearing 54 and a toothed belt 55 to the collection reel shaft 50 to drive same when the indexing roller 52 is driven.

The indexing roller shaft 53 has on its other end a gearwheel 56 with which meshes a gearwheel 57 drive by a crank arm 58 connected by a linkage 59 to a rotatable lever 60 to which, in turn, is adjustably secured a bar 61 fast on a continuously rotatable shaft 62 driven from the machine drive. The rotatable lever 60 is position adjustable along the bar 61 to vary the effective length of the lever/bar combination 60, 61 and consequently the stroke of the crank arm 58. In this way, the indexed length of printing foil PF is controlled.

Above the printing station 21 and the die cutting station 25 is the laminate supply station 23. The laminate is a transparent adhesive-backed film strip LF supplied with a removable paper backing strip BS. It is supplied on a reel 63 which is detachably mounted on a rotatable shaft 64 for rotation therewith, which shaft is connected to the machine drive via an alternately operable brake and clutch (not shown) in the same manner as the label stock supply station. The laminate passes from the supply reel 63 around a guide roller 65 carried by a driven shaft 66 and then down and around a dancer or kick roller 67 carried by a pivotal arm 68 arrangement identical with that of the label stock supply or feed-off station and then up to two guide spindles 69, 70 where the laminate film LF and backing paper BS separate, the laminate film LF with adhesive side remote from the guide spindle 70 passing down towards the printed label stock LS. The backing paper BS passes around the guide spindle 69 onto a collection reel 71 rotatable with a continuously rotatable spindle 72 driven from the machine drive.

The adhesive backed laminate film LF passes under through a pressure nip 73, between which nip the printed label stock LS also passes whereby the laminate film LF is pressed onto the printed label stock LS to adhere thereto.

It will be manifest that initial separation of the film and backing paper is effected by the operator when the machine is being threaded before the machine is operated for a label production run.

The now printed and laminated label stock (simply referenced LS) passes to the die cutting station 25. This is identical in construction and operation to the printing station save that the printing/heating assembly is replaced by a support head 74 to the underside of which is replaceably fitted a cutting die or rule (not shown) of a configuration determined by the desired label format. The support head 74 is moved by a ram 75 operated by motor 39 via the bevel gearing and crankshaft.

The printed, laminated and cut label stock LS now passes through the indexing station 26 which comprises two rollers defining a nip through which the label stock passes. The nip is defined by a bottom indexing roller 76 driven as hereinafter described, and a top rubber-covered pressure roller 77 carried in a frame 78 pivotally mounted at 79 on the machine frame. A pressure screw 80 acts on the frame 78 to permit pressure adjustment.

The printed, laminated and cut label stock LS now moves under a roller 81 at the downstream side of which the cut waste laminate film LW passes upwardly to be wound on a collection reel 82 rotatably fast but detachably mounted on a shaft 83 driven from the shaft 72 of the backing paper collection reel 71.

The label stock LS continues through a nip defined by guide rollers 84, 85 to the label stock collection station 28.

The latter comprises a shaft 86 rotated continuously by the machine drive on which is mounted a collection reel 87 for the finished label stock LS. The latter after passing through the nip rollers 84, 85 passes down around guide rollers 88, 89 and then around a dancer or kick roller 90 carried by a spring-loaded pivotal arm 91 and a final guide roller 92 to the collection reel 87.

The machine mechanisms are driven by the electric motor 39 as aforesaid, and a second electric motor 93 which drives a shaft 94 which, in turn, drives via a chain transmission 95 (i.e. chain and sprocket wheels) the rewind shaft 86 through the intermediary of a reduction gear 96. The various drives to the driven rotatable rollers mentioned above are transmitted by the rewind shaft drive via various chain transmissions generally as disclosed in our aforesaid Patent Application.

The electric motor 93 drives the shaft 97 of the indexing roller 76. The mechanical transmission between the electric motor 93 and the indexing drive shaft 97 comprises a driven shaft 98 parallel with the shaft 94. The shaft 98 mounts a double clutch arrangement 99 consisting of a "fast" clutch 100 and a "slow" clutch 101.

The shaft 98 is supported in bearings 102 in a housing 103, the bearings 102 being retained by circlips 104.

Each clutch 100 or 101 comprises a clutch plate 105 keyed as indicated at 106 to the shaft 98 and an idler clutch plate 107 supported on bearings 108 on the shaft 98. The clutch friction material is indicated at 109. A collar 110 on the shaft 98 resists axial movement of the idler clutch plate 107 along the shaft 98 away from its pre-set position relative to keyed clutch plate 105.

The motor output shaft 111 drives the shaft 94 via a clutch 112, the shaft 94 being supported in bearings 113.

A pulley 114 is keyed on the shaft 94 and is connected by an endless belt 115 to a pulley 116 of equal diameter fast on idler clutch plate 107. An adjustable tensioning pulley 117 cooperates with the endless belt 115. Thus pulleys 114 and 116 and the endless belt 115 constitute the drive to the "fast" clutch 100.

The drive to the "slow" clutch 101 is constituted by a pulley 118 fast on the shaft 94 which is connected by an endless belt 119 to a larger-diameter pulley 120 on an overhead layshaft 121 carried in bearings 122. An adjustable tensioning pulley 123 cooperates with the endless belt 119. The layshaft 121 mounts a pulley 124 of the same diameter as the pulley 118 and this pulley 124 is connected by an endless belt 125 to a larger-diameter pulley 126 fast on the "idler" clutch plate 107 of the "slow" clutch 101.

The speed of the "first" clutch to that of the "slow" clutch has, for example, a nominal rating of 4:1.

A brake 127 is operatively associated with the shaft 98.

The shaft 98 is connected via bevel gearing 128 with the indexing roller shaft 97.

The indexing mechanism comprises an encoder 129 defined by a peripherally toothed wheel 130 fast on the shaft 98 ,passing through a photocell 131 in circuit through a printed circuit board with the electrical control circuitry of the mechanical indexing mechanism.

The aforesaid describes the mechanical transmission between the drive motor 93 and the index roller shaft 97.

Figure 6:
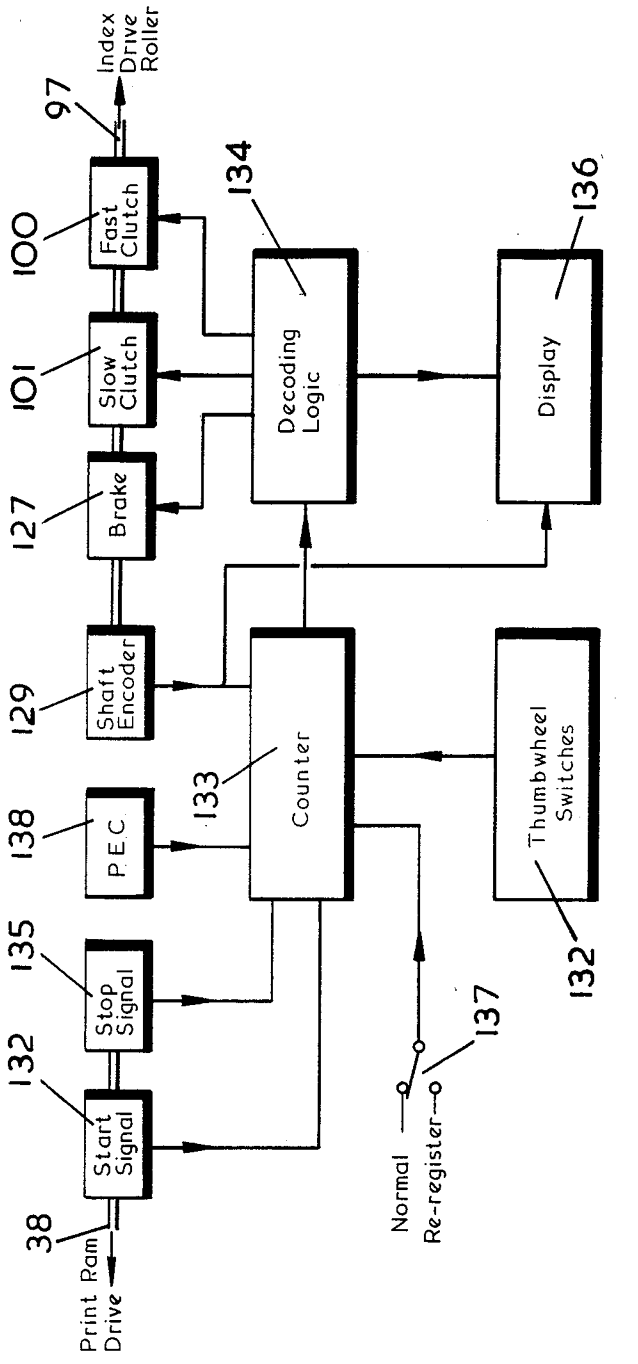
FIG. 6 is a block diagram of the electronic controls of the indexing and re-registration mechanism.
Figure 7:
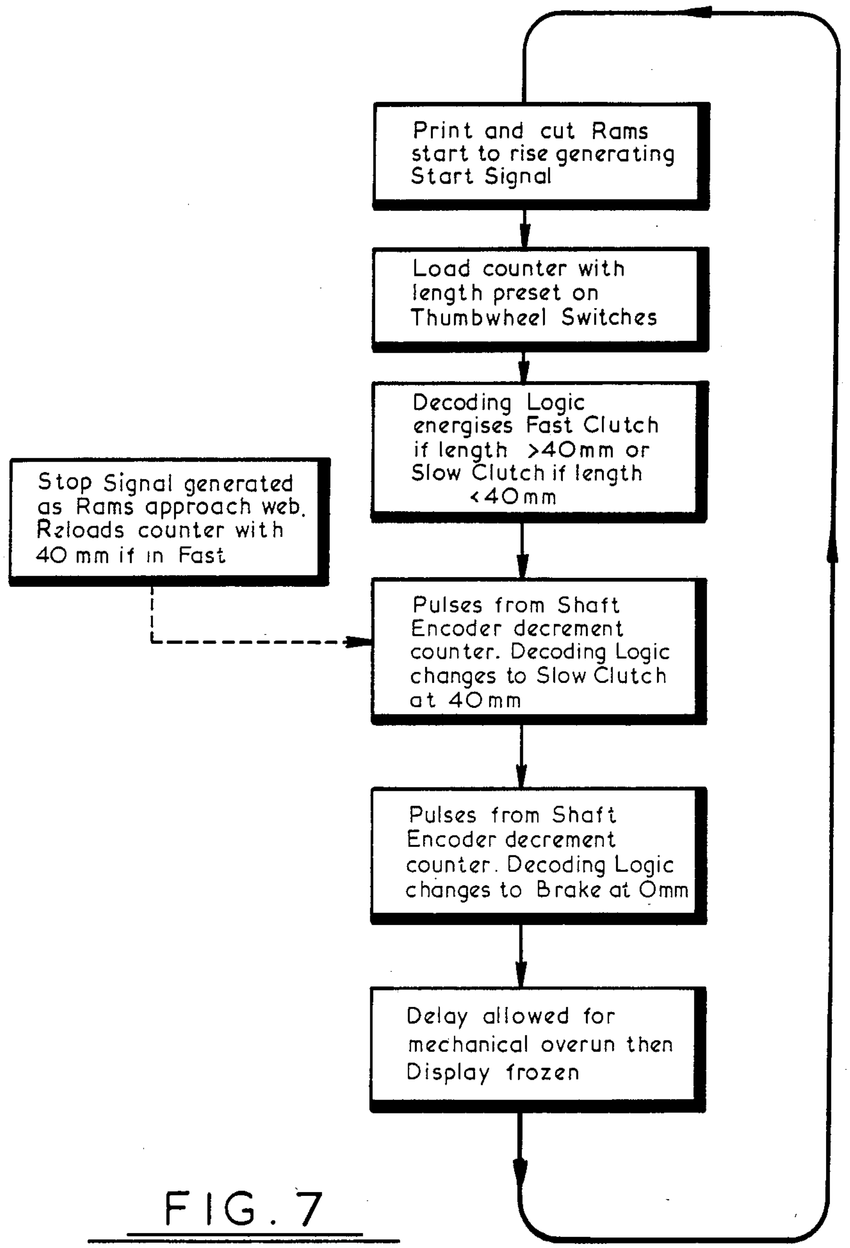
FIG. 7 is a flow diagram of the normal indexing cycle of the label producing machine incorporating the present invention.
Figure 8:
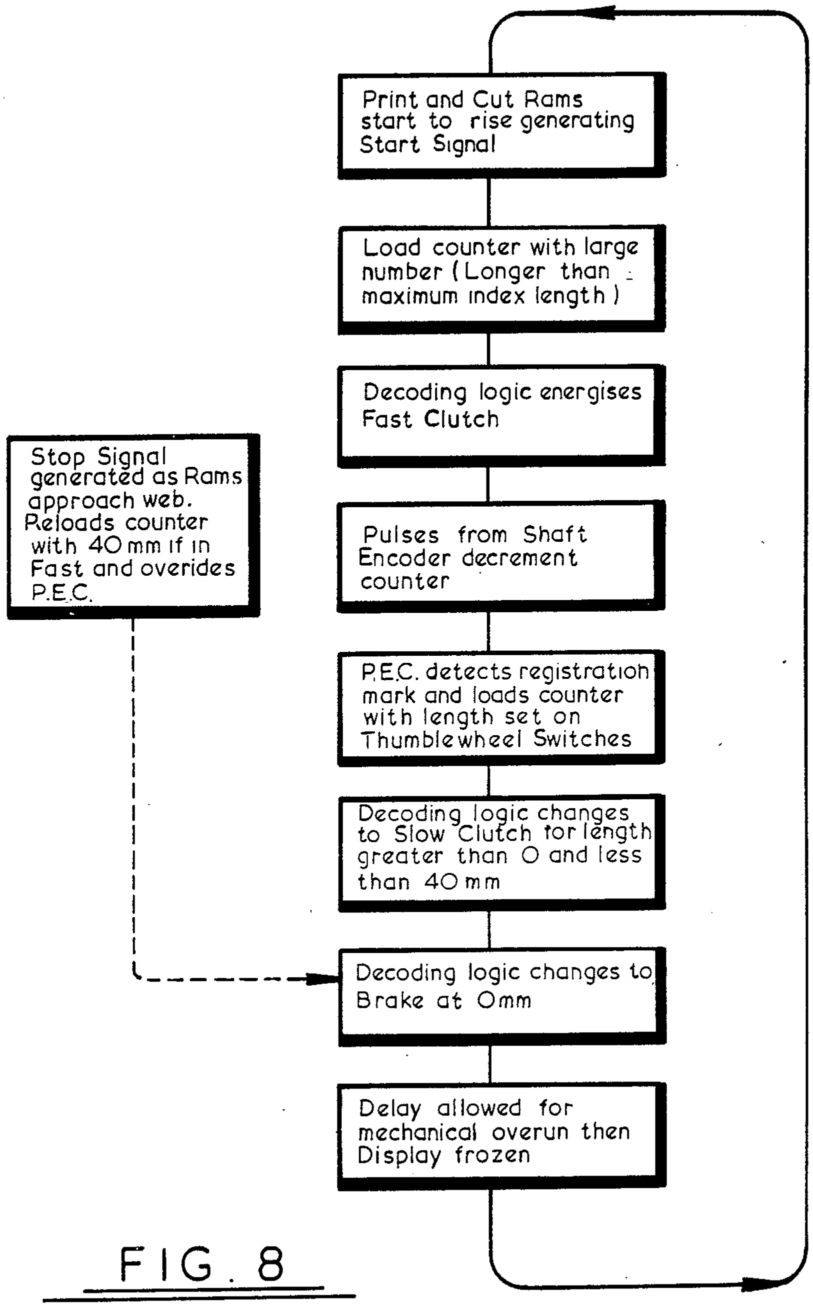
FIG. 8 is a flow diagram of the re-registration cycle.

Reference is now made to FIGS. 6 to 8 which are concerned with the electronic control circuitry of the mechanical indexing mechanism.

Referring firstly to FIGS. 6 and 7 the normal indexing cycle of the machine is obtained by pre-setting a predetermined index length of label stock LS by means of thumbwheel switches 132 of the circuitry (see FIG. 6). The print ram 21 then puts down a foil print on the label stock LS and the overlying print foil PF. As this ram 21 starts to rise after the print, a signal 132 is generated from the shaft 38. This signal is known as the 'start' signal and loads the pre-set index length into a counter 133. The shaft encoder 129 (i.e. peripherally-toothed wheel 130 and photoelectric reader 131) on the index roller drive provides one pulse for every 0.1 mm of web travel. These pulses are used to decrement the counter 133. The outputs from the counter 133 are connected to gating logic 134 that controls the two clutches 100 and 101 and the brake 127. This logic 134 applies a high speed drive to the index roller 97 for the first part of the pull length. The last 40 mm, for example, of this length is then done at a slower speed. If the preset index length is less than 40 mm, all the drive is done at the slower speed.

The sequence of operational steps is clearly set out in the flow diagram of FIG. 7. Briefly, however, with the desired indexing pre-set and the start signal generated by the rising actions of the printing and cutting rams 37, 75, the decoding logic 134 releases the brake 127 and engages the fast clutch 100, the slow clutch 101 being, of course, disengaged. The shaft encoder 129 decrements the counter 133 until only 40 mm of index length is left whereupon the decoding logic 134 disengages the fast clutch 100 and engages the slow clutch 101. Indexing continues at the slow speed until the predetermined index length is achieved at which time the brake 127 is engaged and the slow clutch 101 is disengaged.

With the label stock or web LS being pulled in the fast mode and the printing and cutting heads 36, 74 imminently about to contact the label stock a stop signal 135 is generated by the rams operating shaft 38. The stop signal 135 over-rides whatever count is remaining in the counter 133 which is reloaded with 40 mm so that stoppage of the label stock LS is ensured before the printing and cutting heads 36, 74 make contact with the label stock LS and overlying printing foil PF.

It will be manifest that if the index length is less than 40 mm then only the slow clutch 101 is operated and the stop signal 135 and reloading of the counter 133 sequence is by-passed.

When all the index length has been pulled by the indexing roller 97, the gating logic 134 disconnects the drive thereto and applies the brake 127. A digital read-out 136 then displays the actual length of label stock or web that has been pulled. Because of the response time of the brake 127, some overrun will occur. However, this overrun is consistent and the pull length can be corrected by reducing the pre-set length.

To re-register the machine (see FIGS. 6 and 8) a re-register switch 137 is operated and this enables or renders operational a photo-electric cell 138 positioned just ahead of the print ram 21. It also causes each 'start' signal 132 to load a large index length into the counter 123. When the photo-electric cell 138 detects a registration mark on the label stock LS, the counter 133 is reloaded with the index length pre-set on the thumbwheel switches 132. The gating logic 134 controls the clutches 100 and 101 and the brake 127 as before. The effect of this is that the photo-electric cell 138 can be fixed as close to the print ram 21 as possible, and registration adjustment is simply a matter of changing the pre-set number on the thumbwheel switches 133. By minimising the distance between the photo-electric cell 138 and the print ram 21 the same label that generated the signal from the photo-electric cell 138 can usually be printed, i.e. there is no signalling from several labels 'upstream' of the print ram 21. This eliminates registration inaccuracy due to variation in spacing between labels.

The 'stop' signal 135, as aforesaid, overrides any count that may be left in the counter 133 and so stops the label stock or web before the rams 21, 25 come down. Such a condition would occur, for instance, if the photo-electric cell 138 missed a registration mark and would result in label stock or web breakage.

A switch (not shown) for 'locking out' or isolating the high speed part of the pull can be provided. This is used for short pull lengths and enables the re-registering operation to be performed at the slow speed with better accuracy.

It will be manifest that the indexing mechanism with re-registration facility can be applied to other forms of printing machines.

The pre-setting means may be other than thumbswitches. For example, a keyboard control may be employed.

The reductions transmission from the driving shaft to the slow clutch may be other than the double belt drive/layshaft arrangement described.

What is claimed is:

1. A printing machine for printing labels, for example, and comprising an indexing mechanism for use in indexing predetermined lengths of stock or web through a printing mechanism, the indexing mechanism comprising an indexing roller, a motor for driving the roller, a transmission operatively connecting the motor and the indexing roller and including a driven shaft coupled to the indexing roller and mounting a fast clutch, a slow clutch and a brake, and control circuitry for controlling the clutches and the brake and including means for pre-setting the length of stock or web to be indexed, signal-generating means operated by the printing mechanism to generate a "start" signal adapted to load the pre-set indexed length into a counter, encoding means operated from the indexing roller drive transmission to provide a pulsed output, one pulse equalling a predetermined distance of length travel, and to decrement the counter, and gating logic driven from the counter output to control the clutches and break either to give a fast and subsequently slow pull to each pre-set index length or a slow pull to the pre-set index length dependent upon the value of the pre-set indexed length.

2. A printing mechanism as claimed in claim 1 in which the encoding means comprises a peripherally-toothed wheel or disc fast on the driven shaft and a photo-electric cell or reader past which the toothed periphery is rotated, the photo-electric cell or reader providing the pulsed output to the gating logic.

3. A printing mechanism as claimed in claim 1, in which, with an indexed length sufficient to provide a fast pull follwed by a slow pull, the signal-generating means is operated by the printing mechanism to generate a "stop" at the end of the fall pull to clear the counter and reload same with a predetermined length for short pull.

4. A printing mechanism as claimed in claim 1 in which the gating logic releases the brake upon commencement of each pull and secures it at the end of each pull.

5. A printing mechanism as claimed in claim 1 comprising a registration or re-registration switch for enabling a photo-electric cell disposed immediately upstream of the printing mechanism in terms of stock or web flow, and to cause the signal-generating means to load into the counter at each "start" signal an excessive index length, the said photo-electric cell, upon detecting a registration mark on the stock or web, reloading the counter with the pre-set index length.

6. A printing mechanism as claimed in claim 1 in which the index length pre-setting means comprises thumbwheel switches.

7. A printing mechanism as claimed in claim 1, in which a digital readout of the pulled length of stock or web is provided.

8. A printing mechanism as claimed in claim 1 in which the transmission from the driving motor to the fast clutch comprises a direct pulley-and-belt drive between the motor driving shaft to the fast clutch on the driven shaft.

9. A printing mechanism as claimed in claim 1 in which the transmission from the driving motor to the slow clutch comprises a speed reduction transmission comprises a first pulley-and-belt drive between the motor driving shaft and a layshaft and a second pulley-and-belt drive between the layshaft and the slow clutch on the driven shaft.

* * * * *